Patented Feb. 8, 1966

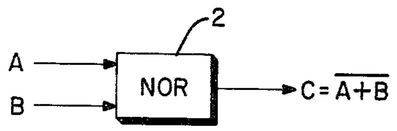
Fig. 1
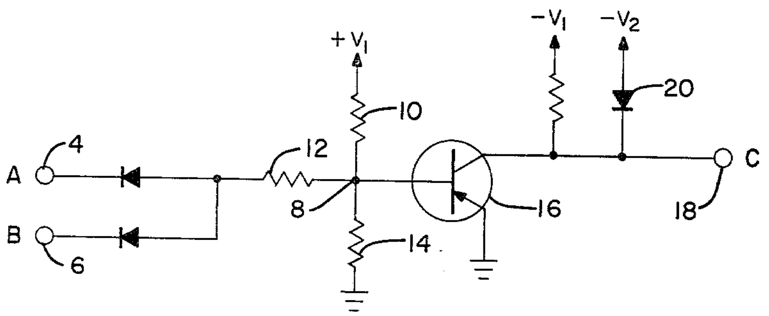
Fig. 2
| X | Y | LOGICAL SUM |
|---|---|---|
| 0 | 0 | 0 |
| 0 | 1 | 1 |
| 1 | 0 | 1 |
| 1 | 1 | 0 |
Fig. 4a
| X | Y | GENERATE CARRY |
|---|---|---|
| 0 | 0 | 0 |
| 0 | 1 | 0 |
| 1 | 0 | 0 |
| 1 | 1 | 1 |
Fig. 4b
| X | Y | CARRY ENABLE |
|---|---|---|
| 0 | 0 | 0 |
| 0 | 1 | 1 |
| 1 | 0 | 1 |
| 1 | 1 | 0 |
Fig. 4c
| CARRY | LOGICAL SUM | TRUE SUM |
|---|---|---|
| 0 | 0 | 0 |
| 0 | 1 | 1 |
| 1 | 0 | 1 |
| 1 | 1 | 0 |
Fig. 4d
INVENTOR
HERMAN OSOFSKY
BY Thomas J. Nikolai
AGENT United States Patent Office 3,234,371

3,234,371
PARALLEL ADDER CIRCUIT WITH IMPROVED CARRY CIRCUITRY

Herman Osofsky, St. Paul, Minn., assignor to Sperry Rand Corporation, New York, N.Y., a corporation of Delaware Filed Mar. 29, 1962, Ser. No. 183,449
16 Claims. (Cl. 235—175)

This invention relates generally to arithmetic circuits for digital data processing apparatus, and more specifically to an improved adder circuit for forming the sum of two binary numbers in a parallel fashion.

In the prior art there are described several arrangements for forming the sum of two binary numbers wherein means are provided for logically combining addend digits, augend digits, and a digit representing a carry from a lower order stage, for forming a signal representing the true sum of said signals and for forming carry signals to be propagated to a higher order stages if circumstances warrant it. Where high operating speed rather than cost is the criterion, it has proved expedient to employ a pyramiding principle to reduce the time delays caused by the propagating or "rippling through" of carry signals between stages. A typical example of such a pyramid is the so-called "Carry Tree." Because the Carry Tree type of adder requires a relatively large amount of hardware, schemes have been devised for compromising operational speed and cost. In these arrangements the numbers to be added are sub-divided into a plurality of groups, each containing a predetermined number of digit stages. Circuits operating in a manner similar to the Carry Tree are provided for determining whether or not a carry signal from a lower order group will be absorbed in a higher order group. This determination is made concurrently with the summing of the digit within the groups. If signals from a lower order group cannot be absorbed in the adjacent higher order group, means are provided for preventing a carry signal from rippling through this adjacent higher order group. While this arrangement is not as fast as the straight carry tree method of adding it does improve the operating speed of known ripple through adders. Since appreciably less hardware is required in the second arrangement, its cost is substantially less than the cost of a straight Carry Tree arrangement.

The present invention is an improvement over the second mentioned prior art adder. It provides a means for reducing the intra-group carry propagation time. In other words, the add time of the device is reduced by effecting higher carry propagation rates than heretofore possible.

Data are represented in a digital computer by groups of signals which may assume two distinct conditions or states. For example, a signal representing a binary "one" may be a potential of −3 volts whereas a signal representing a binary "zero" may be a potential of zero volts. In prior art adders wherein a signal representing a carry from a lower order adder stage must be propagated through several higher order stages before it can be satisfied, the carry signal undergoes an inversion in each stage. That is, if a carry signal is represented by a potential of −3 volts, as it passes from stage $n$ to stage $n+1$ it undergoes an inversion so as to become a signal of 0 volts. In order to properly combine the carry signal with the digits to be added in stage $n+1$, it is necessary to insert an additional amplifier or inverter in the path between stage $n$ and $n+1$ to return the propagated carry signal to its normal level of −3 volts, so that it may properly be combined in stage $n+1$. In passing through the inverter, the carry representing signal is subjected to a delay. If the time it takes for a signal to pass through an inverter is taken as a standard or unit delay, it can be seen that the prior art adders require a delay of two units for the carry signal to be propagated in its proper form from a lower order stage to its next higher order stage.

In the adders made in accordance with the teachings of this invention, alternate adder stages are capable of utilizing the complement of the carry signal presented to the immediately preceding stage. That is, if a carry signal of −3 volts representing a binary "1" is propagated into stage $n$, but cannot be satisfied therein, the carry signal propagated to stage $n+1$ is a potential of 0 volts. Because of the logical design employed in the present invention stage $n+1$ is capable of accepting the 0 volt signal as is, and there is no need for an additional inverter stage between stage $n$ and $n+1$. Hence, the propagation time of carry signals between stages is reduced to one-half of that required by the prior art adders.

In the adders made in accordance with the teachings of the present invention the need for the additional inverter between stages is eliminated. Hence, the propagation time of carry signals between stages is reduced to one-half of that required by the prior art adders.

The adder of this invention performs the function of adding the contents of the addend register to the contents of the augend register to obtain a sum. Because the apparatus described herein is incorporated in a subtractive type data processor, the sum is actually obtained by subtracting the complement of the contents of the augend register from the contents of addend register $(X-(-Y)=X+Y)$. In the process of performing addition by subtraction, borrow signals are generated and often must be propagated to higher-order stages. Up to this point, the propagated signal occurring in the addition process has been termed a carry signal. It should be understood that what has been said about the carry signal is also true for the borrow signal.

It is accordingly an object of the present invention to provide an improved adder for use in digital computing apparatus.

It is another object of this invention to provide means for reducing the time required to propagate intra-group carry signals of a binary adder employing a pyramid for handling the inter-group carrys.

It is a still further object of this invention to provide an improved adder in which the "ripple through" carry or borrow operation is divided into groups and the carries or borrows between groups are generated concurrently with the addition of the digits in the groups.

The novel features which are believed to be characteristics of the invention, both as to its organization and method of operation, together with further objects and advantages thereof, will be better understood from the following description considered in connection with the accompanying drawings in which several embodiments of the invention are illustrated by way of examples. It should be understood, however, that the drawings are for the purpose of illustration and description only, and are not intended to define the scope of the invention.

In the drawings:

FIG. 1 is a functional block diagram of the NOR circuit;

FIG. 2 is a schematic diagram of a two input NOR logic circuit;

FIGS. 4A through 4D illustrates various truth tables for the adder of this invention.

Figure 3:
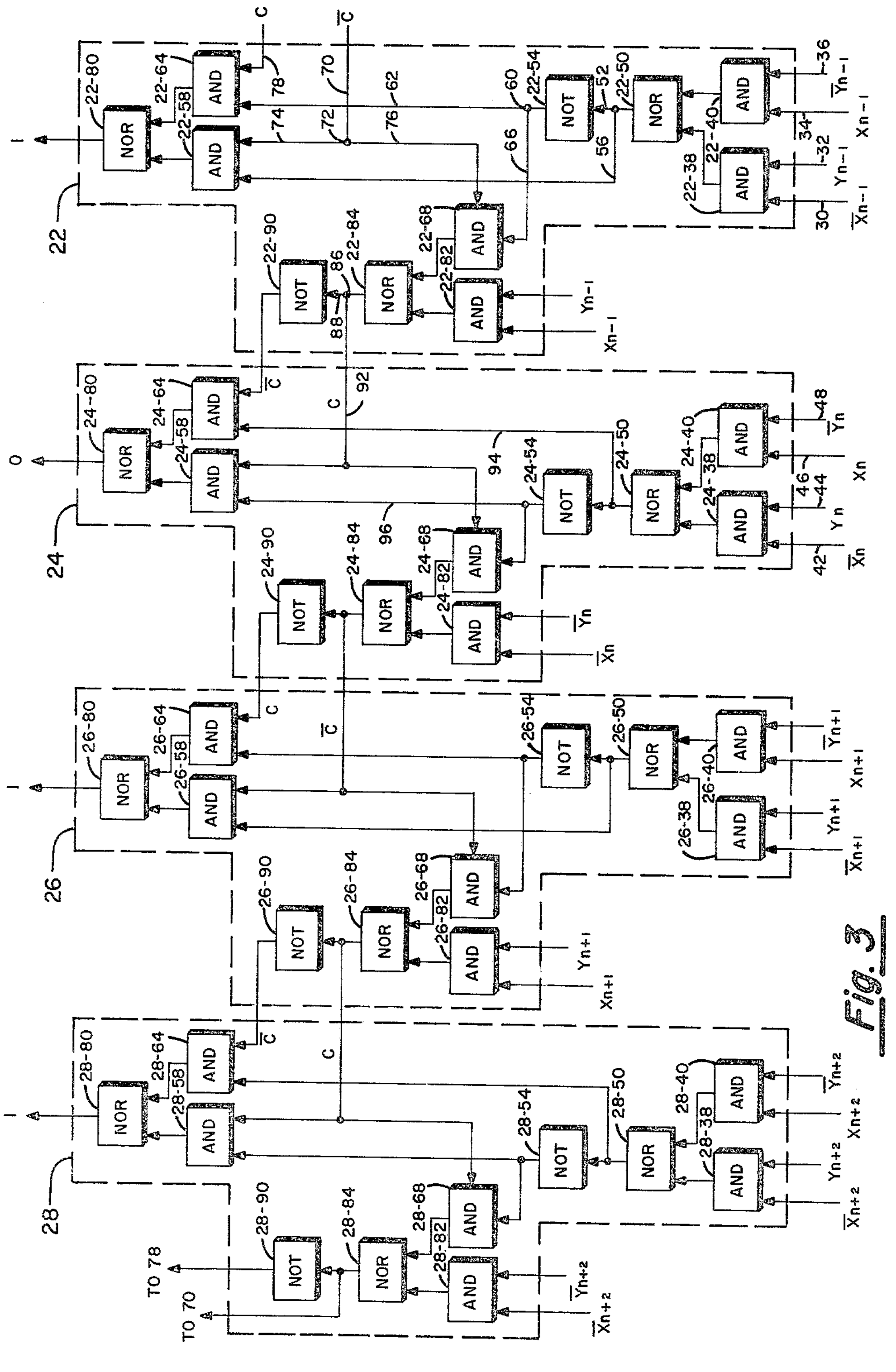
FIG. 3 is an exemplary logical block diagram for four bits of an adder, made in accordance with the teachings of this invention.

Before describing the details of the operation of the preferred embodiments of this invention, the basic logic circuits employed therein will be described. Referring to FIG. 1 there is shown in block diagram form the basic building block utilized in the circuitry of the present invention. The block 2 represents an OR INVERTER, often referred to in the art as a NOR circuit. An OR INVERTER may have a plurality of input terminals and a single output terminal. In one form of an OR INVERTER, a logical "1" signal applied to one or more of the input terminals causes the signal appearing at the output terminal to be a logical "0." It is only when all of the inputs are "0's" that a logical "1" signal will appear at the output terminal thereof.

In FIG. 2 there is shown one circuit for implementing the NOR logic block. Since other circuits can be devised for performing this type of logic, the circuit illustrated in FIG. 2 is only typical and limitation thereto is not intended. In the apparatus of the present invention a logical "1" signal is represented by a potential of —3 volts while a logical "0" is represented by a potential of 0 volts. When a "0" is present on one or more of the input terminals 4 or 6 and no logical "1's" are present on any of these input terminals, the junction 8 in the circuit diagram is maintained slightly positive by means of the voltage source $+V_1$ and a voltage divider comprised of resistors 10, 12, and 14. Since the base of transistor 16 is positive with respect to its emitter electrode which is held at ground potential, the emitter junction is biased in the reverse direction and thus the impedance between its emitter and collector is relatively high. The collector junction is always reverse biased by means of the voltage source $-V_1$, thus current will flow across the collector junction only when the bias is reversed on the emitter junction. For the purpose of this explanation leakage currents are ignored. The output terminal 18 is held at —3 volts ($V_2$) representing a logical "1" by the clamping diode 20 connected to the $-V_2$ supply.

If a logical "1" signal (—3 volts) is applied to one or more of the input terminals 4 or 6, the base of the transistor 16 becomes negative with respect to its emitter. Hence, a relatively high current can flow between the emitter and collector, such that the output voltage rises to almost ground or 0 volts representing a logical "0." While only two input terminals are illustrated in the schematic diagram of FIG. 2 it should be understood that a greater or lesser number may be employed. Also, the output of this circuit may be fanned out so as to drive the inputs of several other similar NOR circuits or other type of logic circuits. It can be seen that when the NOR circuit of FIG. 2 has only a single input terminal it acts as an inverter or logic NOT circuit. In other words, if a —3 volt signal is applied at its input terminal, the transistor 16 is rendered conductive causing the output terminal 18 to be at approximately ground potential, thereby indicating a logical "0" signal at its output. On the other hand, if a "0" signal is applied to its input terminal the transistor 16 remains in its nonconductive state and hence the output terminal 18 is held at a potential of —3 volts (representing a "1" signal) by means of a source $-V_2$ and the clamping diode 20.

The only other logic *network* utilized in the embodiment of the adders of this invention is the well-known AND circuit. Since many variations of the AND circuit are well-known in the art, it is felt to be unnecessary to describe a specific embodiment of it in detail. It is of course understood that by making appropriate adjustments of bias voltages and by defining the voltage levels for representing logical 1's and 0's that so-called NAND circuit (AND-Inverters) can replace the described NOR circuits.

Referring now to FIG. 3, there is shown a logical block diagram of four stages of a $k$ stage adder. The stages are illustrated as being enclosed by the dashed boxes 22, 24, 26, and 28. Because the stages are substantially identical to one another except for the manner of interconnected adjacent stages, it is felt to be unnecessary to describe the details of the construction and operation of more than four stages. Anyone skilled in the art should be able to readily expand the system to any number of stages after having read the present specification. As has already been mentioned, the complete adder may include $k$ stages divided into $k/m$ groups, where $m$ is a integer which divides evenly into $k$. Between group can be included suitable pyramiding circuitry for determining whether or not a carry signal coming from a lower order group can be absorbed in a higher order group. Since the present invention is concerned primarily with increasing the speed of carry propagation within a group, it is felt to be unnecessary to include a description of the intergroup carry structure. The philosophy of the adder pyramid is fully explained in an article entitled, "High-Speed Arithmetic in Binary Computers" by P. L. MacSorley in the January 1961 issue of the Proceedings of the IRE.

The device under consideration being a parallel adder, the output signal from each stage of the augend register (X—register) and the addend register (Y—register) are applied simultaneously to the adder input terminals for corresponding stages. For example, signals $\overline{X}_{n-1}$, $Y_{n-1}$, $X_{n-1}$ and $\overline{Y}_{n-1}$ from the $n-1$ bit position flip-flop stage of the X and Y registers are applied by way of conductors 30, 32, 34, and 36 to the input terminals of a pair of AND logic circuits 22–38 and 22–40 associated with the $n-1$ stage of the adder shown enclosed by dashed line 22. In the present embodiment the signal aplied to the adder by way of conductor 30 is the complement of the direct or true output from this same stage (identified as $X_{n-1}$). In a similar manner, the direct output from the $n-1$ stage flip-flop of the Y register is applied to the AND circuit 22–38 by way of conductor 32 whereas the complement signal $\overline{Y}_{n-1}$ is applied to the AND circuit 22–40 by way of conductor 36.

In the same way as has been described, the next higher orders stages ($X_n$ and $Y_n$) of the augend and addend registers provide outputs which are applied to the input terminals 42, 44, 46, and 48 of the next higher order adder stage shown enclosed by dashed box 24. As before, the direct output from the $n$th stage of the augend register is ANDED together with the complement output of the corresponding stage of the addend register by means of the AND circuit 24–40, and the complement output from the $n$th stage of the augend register is ANDED together with the direct output from the corresponding stage of the addend register in AND circuit 24–38.

Referring again to stage $n-1$ of the adder enclosed by the dashed line 22, it can be seen that the AND circuits 22–38 and 22–40 each provide an output to the terminals of a NOR circuit 22–50. The output signal from NOR circuit 22–50 is applied by way of conductor 52 to an inverter, or NOT circuit 22–54. The signal from NOR circuit 22–50 is also applied by way of a conductor 56 to a first input terminal of an AND circuit 22–58. The output signal from NOT circuit 22–54 appears at the junction 60 and from there is applied by way of a conductor 62 to a first input terminal of AND circuit 22–64. The signal at junction 60 also passes via conductor 66 to a first input terminal of AND circuit 22–68 associated with the carry generating circuit of adder stage $n-1$. A carry signal or its complement (a not carry signal) coming from an adjacent lower order stage (or from the highest order stage in the event of an end around carry) appears on the conductor 70 and at the junction 72. From junction 72 this signal first passes by way of conductor 74 to second input terminal of AND circuit 22–58 and by way of the conductor 76 to the second input terminals of AND circuit 22–68. The second input for AND circuit 22–64 also comes from the carry generating network of an adjacent lower order stage or from the highest order stage in the group, and is applied to it by way of a conductor 78. The signal on conductor 78 is always the complement of the signal appearing on conductor 70.

AND circuits 22–58 and 22–64 each provide an output which is connected to the input terminals of a NOR circuit 22–80. As will be shown more fully hereinbelow when the details of the operation of the circuit of FIG. 3 are described, the signal appearing at the output of NOR circuit 22–80 indicates the true sum of the signals applied to the input terminals 32 and 34 and the carry signal, if any, coming from the highest order stage $n+2$ or a lower order stage $n-2$ (not shown) if stage $n-1$ does not happen to be the lowest order stage of the adder.

The AND circuit 22–82 associated with the carry generating circuit of the lowest order stage illustrated, receives the direct inputs $X_{n-1}$ and $Y_{n-1}$ from the corresponding terminals of the augend and addend register (not shown). The output terminals of AND circuits 22–82 and 22–68 are connected to the input terminal of a NOR circuit 22–84. The output from this NOR circuit appears at junction 86 and from there is applied by way of conductor 88 to a NOT circuit 22–90. The signal at junction 86 also appears on conductor 92 which provides a path for the carry signal or its complement to the next higher order stage. The next higher-order stage is shown as being enclosed by the dashed box 24. The complement of the signal appearing on conductor 92 is developed at the output terminal of NOT circuit 22–90 and is applied to the AND circuit 24–64 of the next higher order adder stage in the same manner as the carry signal was applied to AND circuit 22–64 of stage $n-1$.

The circuits contained in the adder stage 24 (i.e., the stage enclosed by box 24) are identical to the circuits described above except for the manner in which the output from the NOR circuit 24–50, which corresponds to NOR circuit 22–50, is connected to its associated AND circuit, and in the manner in which the output signals from the augend and addend registers are applied to the AND circuit 24–82, which corresponds to the AND circuit 22–82 of the preceding stage. More specifically, in the stage 24 the output from NOR circuit 24–50 is connected by way of conductor 94 to a first input terminals of AND circuit 24–64. AND circuit 24–64 corresponds to AND circuit 22–64 of stage $n-1$. In stage $n-1$, AND circuit 22–64 receives the complement or inverted output from NOR circuit 22–50 by way of NOT circuit 22–56, whereas the $n$th stage AND circuit 24–64 receives the direct output from NOR circuit 24–50. Similarly, in stage $n-1$, the AND circuit 22–58 receives the direct output from NOR circuit 22–50 by way of conductor 56, whereas in the $n$th stage the AND circuit 24–58 receives the inverted output from the NOR circuit 24–50 by way of NOT circuit 24–54 and condutor 96. Whereas the inputs to AND circuit 22–82 of stage $n-1$ come from the direct outputs of the stage $n-1$ flip-flops of the addend and augend registers, the AND circuit 24–82 of stage $n$ receives the complement outputs from the $n$th order stages of these registers.

The connections in the adder stage $n+1$ (shown enclosed by the dashed box 26) are identical to the connections in stage $n-1$. Also, the connections in stage $n+2$ are identical to the connections in stage $n$. It can be seen that the even numbered stages, i.e., stages for which $n$ is an odd integer, receive the direct output from the corresponding addend and augend registers in forming the carry signal for their adjacent higher order stage, whereas the odd numbered stages ($n$ is an even integer) receive the complement output from the corresponding addend and augend registers in forming the carry signal for their adjacent higher order stage.

Now that the circuit layout has been described in detail, the operation of this embodiment of the adder circuit of this invention will be considered.

*Operation*

The operation of the adder apparatus of FIG. 3 can best be understood by considering that each individual stage thereof is comprised of three main parts. As will be explained more fully hereinbelow, a first portion of each stage combines the input signal thereto in such a way that the logical sum of the input signals, i.e., the sum neglecting carrys from a lower order stage, is formed at its output. This signal representing the logical sum appears at the output from the NOT circuits 22–54, 24–54, etc. A second portion of each stage examines the input signals as well as any carry signals which may or may not be propagated from an adjacent lower order stage and forms a carry signal which is passed on to the adjacent higher order stage provided the proper condition exist. The carry signal generating circuitry includes the two AND circuits 22–68 and 22–82, the NOR circuit 22–84 and the NOT circuit 22–90. The third portion of each stage combines the logical sum signal developed in that stage with the carry signals transmitted from a lower order stage to produce a signal representing the true sum of the input signals. In the circuit of FIG. 3, the signal representing the true sum appears at the output of the NOR circuits 22–80, 24–80, etc.

Referring specifically to stage $n-1$, by using conventional notation of Boolean algebra it can be seen that the signal appearing at the output of AND circuit 22–38 may be represented as $\bar{X}_{n-1}Y_{n-1}$. Similarly, the signal appearing at the output of AND circuit 22–40 may be represented by the expression $X_{n-1}\bar{Y}_{n-1}$. Since these signals are applied to the NOR circuit 22–50, the signal appearing on conductor 52 and 56 may be represented by the Boolean expression $\overline{\bar{X}_{n-1}Y_{n-1}+X_{n-1}\bar{Y}_{n-1}}$. This expression is the complement of the logical sum and will be represented herein by the symbol $\bar{S}'$. This signal being applied to the inverter 22–54 causes the complement or true logical sum S′ to appear at the junction 60.

The truth table of FIG. 4*a* illustrates the condition of the output signal from the NOT circuit 22–54 for the four possible combinations of input signals. This truth table is identical to that for the well known EXCLUSIVE OR logic circuit and hence, the combination of the AND circuits 22–38 and 22–40, the NOR circuits 22–50 and the NOT circuits 22–54 can be considered as an EXCLUSIVE OR logic block.

FIG. 4*b* is a truth table illustrating the various combinations of input signals which will cause a carry signal to be generated. It can be seen that only when the input signals are both logical "1" signals will a carry signal be generated. Whether or not a carry signal will be propagated to an adjacent higher order is also dependent upon whether or not a carry signal from an adjacent lower order stage can be absorbed in the stage in question. The truth table of FIG. 4*c* shows that there are two conditions upon which a carry signal entering a stage from the next lower-order stage should be propagated into the next higher order stage. Those conditions are when the input signals from the augend and addend registers are not alike. It should be noted that the truth table of the logical sum illustrated in FIG. 4*a*, is identical to that of FIG. 4*c*.

The function of the AND circuits 22–82 is to examine the input signals $X_{n-1}Y_{n-1}$ to determine whether or not a carry signal should be generated and passed on to stage $n$. If stage $X_{n-1}$ of the augend register and $Y_{n-1}$ of the addend register are both in the "1" state, because of the arbitrary way in which the state of a flip-flop may be defined, the output from AND circuits 22–82 will be a logical "0" signal. Provided that AND circuits 22–68 is also outputting a logical "0" signal the output from NOR circuit 22–84 appearing at the junction 86 will be a logical "1" signal indicating that a carry signal is generated for propagation to adder stage $n$. Under the assumed conditions, i.e., the stage $n-1$ of the augend and addend registers both contain a "1" signal, the output from the EXCLUSIVE OR circuit mentioned previously will be a "0" thereby insuring that the output from AND circuits 22–68 will also be a 0. If the input to AND circuits 22–82 are any of the other combinations illustrated in the truth table of FIG. 4*b*, a carry signal will not be generated in stage $n-1$. This is not to say, however, that a carry signal will not appear on condutor 92 and be applied to stage $n$ because it is possible that a carry signal from a lower order stage cannot be satisfied in stage $n-1$ and must be propagated further up the line. The truth table of FIG. 4 illustrates the conditions under which the carry generating circuit of stage $n-1$ will be enabled to permit propagation of a carry signal from stage $n-2$ (not shown) to stage $n$. As mentioned previously, the carry enable signal is the same as the logical sum signal, S′. As shown in FIG. 3 the output from NOT circuits 22–54, which is the logical sum signal, is applied by way of conductor 66 to a first input terminal of AND circuits 22–68 to thereby serve as a carry enable signal. Provided that no carry signal is generated in or propagated through stage $n-2$ the signal appearing on conductor 70 will be a logical "1." Therefore, the output from AND circuits 22–68 will also be a "1" signal causing NOR circuits 22–84 to output a logical "0" indicating that no carry signal is to be propagated to stage $n$. Had a carry signal been passed on from stage $n-2$, AND circuits 22–68 would have produced a "0" signal at its output causing NOR circuits 22–84 to generate a "1" signal at junction 86 indicating a carry signal is to be passed on to stage $n$.

The AND circuits 22–64 combines any carry signal which may come from stage $n-2$ with the logical sum signal $S'_{n-1}$ of stage $n-1$ to form a signal at its output which may be represented by the expression $S'_{n-1}C_{n-2}$. In a similar manner, the AND circuits 22–58 combines the complement of the carry signal from stage $n-2$ with the complement of the logical sum of stage $n-1$ to form a signal which may be represented by the expression $\overline{S'}_{n-1}\overline{C}_{n-2}$. Therefore, output from NOR circuit 22–80 may be expressed by the equation $\overline{S'_{n-1}C_{n-2}+\overline{S'}_{n-1}\overline{C}_{n-2}}$. By using Boolean algebra it can be shown that this expression is identical to the one resulting from the application of these signals to an EXCLUSIVE OR circuit.

Referring now to stage $n$ of the adder circuit of FIG. 3, which is shown as being enclosed by the dashed box 24, it can be seen that this stage is quite similar to stage $n-1$ discussed above. However, there are two differences involved. First of all, rather than combining the logical sum signal S′ with the carry signal C in the AND circuit 24–64 as was done in stage $n-1$, in stage $n$ the complement of the logical sum signal ($\overline{S'}_n$) is combined with the complement of the carry signal $C_{n-1}$. More specifically, the output of NOR circuit 24–50 is applied by way of conductor 94 to a first input of AND circuit 24–64 and the output from NOT circuit 22–90 is applied to the second input of this same AND circuit. Since the signal appearing at junction 86 was defined as the carry signal $C_{n-1}$, the signal appearing at the output of NOT circuit 22–90 is the complement of the carry signal or $\overline{C}_{n-1}$. In stage $n$ the logical sum signal $S'_n$ appearing at the output of NOT circuit 24–54 is applied by way of conductor 96 to the first input terminal of AND circuit 24–58 where it's logically combined with the carry signal from stage $n-1$. It may be recalled that stage $n-1$ of this ANDING function was performed by the circuit 22–64.

The second difference between stage $n$ stage $n-1$ lies in the manner in which the inputs are connected to the AND circuit 24–82 of the carry generating network of stage $n$. Whereas in stage $n-1$ the AND circuit 22–82 receives the direct inputs from the $n-1$ stages of the augend and addend registers, in stage $n$ the AND circuit 24–82 receives the complement signals from stage $n$ of the augend and addend registers, i.e., the signals $\overline{X}_n$ and $\overline{Y}_n$. Also, in stage $n-1$ the AND circuit 22–68 receives the NOT CARRY signal $\overline{C}_{n-2}$, whereas the AND circuit 24–68 receives the carry signal $C_{n-1}$. As a result, the signal appearing at the output of NOR circuit 24–84 may be expressed by the Boolean expression $$\overline{C_{n-1}S'_{n-}+\overline{X}_n\overline{Y}_n}$$

whereas the signal appearing at the output of NOR circuit 22–84 is expressed by $\overline{\overline{C}_{n-2}S'_{n-1}+\overline{X}_{n-1}\overline{Y}_{n-1}}$. By manipulating these expressions according to the rules of Boolean algebra or by developing a truth table for the various possible combinations of X, Y and C it can be shown that the expression for the signal appearing at the output of NOR circuit 24–84 is the complement of the expression for the signal appearing at the output of NOR circuit 22–84.

The carry generating network of stage $n+1$ is identical to that of stage $n-1$ except for the fact that the inputs to AND circuit 26–82 come from the augend and addend register stages $n+1$. On the other hand, the carry generating network for stage $n+2$ is identical to that of stage $n$, the AND circuit 28–82 receiving the complement of the inputs from stages $n+2$ of the augend and addend registers. The output of NOR circuit 28–84 may be connected to the conductor 70 of adder stage $n-1$ to provide for the propagation of an end around carry. Similarly, the signal appearing at the output of NOT circuit 28–90 may be connected to the conductor 78 of stage $n-1$ for the same reason. Of course, if more than four stages are employed in a group, it is the output from the carry generating network of the final stage in the group that is connected back to the initial stage.

An important feature to note is that in the adder arrangement of the present invention an adjacent higher order stage is able to utilize either the complement of the carry signal or the carry signal itself. In order to obtain the signal of the proper polarity indicating a carry so that the carry may be logically combined in a similar manner on the next higher order stage to determine if continued propagation is required, prior art adders require an additional amplifier or inverters to again invert the signal so that it will be of the proper polarity. If the signal delay caused by each of the amplifiers required is considered as a unit delay, it can be seen that there are two unit delays between each stage of the prior art adders, and this must be multiplied by the number of stages in the adder to determine the total amount of delay in reaching the final sum. Because of the logical design of the adder of this invention, only a single unit delay per stage results, and therefore, the overall delay is only one-half of what it is in the prior art adders. As mentioned before, this result is achieved by utilizing the signal which is the complement of the carry logically combined with the proper signals into alternate stages. In other words, in the apparatus of the present invention a stage of inversion is not required to insure that the carry generating network always receives a carry signal of the same polarity.

In order to more clearly illustrate the operation of the adder of FIG. 3, assume that it is desired to add the numbers 1010 (decimal 10) and 0011 (decimal 3). Before the addition can take place the number 1010 must initially be placed in the augend register and the number 0011 must be placed in the addend register. For the purpose of explanation it can be assumed that this operation has already been performed. It can be seen that the lowest order stage of these two registers contain the digits 0 and 1, respectively. Similarly, the digits 1 and 1 are contained in the next higher order stages of these registers, the digits 0 and 0 in the stages $n+1$, and the digits 1 and 0 in the stages $n+2$. Under the assumed conditions, the signal appearing on the input conductors 30 and 32 of stage $n-1$ will each be logical "0" signals whereas those appearing on conductor 34 and 36 will each be logical "1" signals. The signals appearing on conductors 42, 44, 46, and 48 of adder stage $n$ are respectively 1, 0, 0, and 1. In stage $n+1$ the signals applied to AND circuit 26–38 are 0 and 1, and the signal applied to AND circuit 26–40 are 1 and 0. Finally, the signals applied to AND circuit 28–38 of stage $n+2$ are both logical "1's." The inputs for AND circuit 28–40 are both at their logical "0" level. Referring again to stage 22, with the inputs to AND circuit 22–40 both logical "1's," a logical "1" signal appears on its output causing the NOR circuit 22–50 to output a logical "0" signal on its conductor 52. In stage 24, since neither of the AND circuits 38 or 40 are satisfied, NOR circuit 24–50 receives "0" signals on both of its inputs, causing a logical "1" signal to appear at its output. The same is true for stage 26, i.e., a logical "1" appears at the output of NOR circuit 26–50. In stage 28, however, AND circuit 28–38 has both of its inputs at the "1" level such that NOR circuit 28–50 outputs a logical "0" signal. Reading from right to left, then, the signal pattern appearing at the outputs of NOR circuits 50 is 0110. Because of the inverters or NOR circuits 22–54; 24–54 etc., the final pattern appearing at their output, reading from right to left, will be 1001. It can be seen that this signal group represents the logical sum of the two numbers assumed to be in the augend and addend registers.

In order to find the true sum of the input numbers it is necessary to determine the carry pattern resulting upon the addition, and to combine this carry pattern with the logical sum already developed. This is the function of the carry generating network of each stage. Referring first to stage $n-1$, the AND circuit 22–82 receives the input signal $X_{n-1}Y_{n-1}$ which are "1" and "0" respectively. The output of this AND circuit is therefore a logical "0" signal. A first input to AND circuit 22–68 is the carry enable signal, which is identical to the logical sum signal appearing at the junction 60. This signal is applied to AND circuit 22–86 by way of conductor 66. In order to determine the output of AND circuit 22–68 it is necessary to know the state of the input applied to it by way of conductors 70 and 76. As mentioned previously, the signal on conductor 70 represents an end around carry coming from the highest order stage in the group. Let it be assumed that in the present example this signal is a logical "1." Later, when the output from the carry generating network of stage $n+2$ is analyzed, it will be found that such is the case. Since the signal on conductor 70 represents the "not carry" condition and it is a "1," it means that in reality no carry signal is being propagated from stage $n+2$. At any rate, AND circuit 22–68 has both of its inputs at the "1" level and outputs a "1" signal to NOR circuit 22–84. The output from NOR circuit 24 appearing at junction 86 is, therefore, a logical "0" signal. This signal represents the actual carry condition and indicates that no carry signal is generated in stage $n-1$ and also that no end around carry signal is propagated through stage $n-1$ from stage $n+2$.

Because AND circuit 24–82 of stage $n$ receives the complement outputs from the augend and addend registers, both of its inputs will be at the logical "1" level, which causes a "1" signal to be applied to NOR circuit 24–84. Hence, the output from this NOR circuit, which represents a "not carry" signal, is a 0, indicating that, in fact, a carry signal has been generated and should be passed on to stage $n+1$.

In stage $n+1$ AND circuit 26–82 has both of its inputs at the logical "1" level. A "1" signal is therefore applied to NOR circuit 26–84, which causes a "0" to appear at its output. This "0" being on the carry output line indicates that no carry signal has been generated in stage $n+1$ and that the carry signal which was generated in stage $n$ has been absorbed in stage $n+1$.

In stage $n+2$ AND circuit 28–82 has a "1" on its input line $\overline{X}_{n+2}$ and a "0" signal on its input line $\overline{Y}_{n-2}$. Hence, a "0" signal appears at its output. A "1" signal is applied to AND circuit 28–68 from the output of NOT circuit 28–54. However, as has been determined, the carry signal which is applied thereto is a "0" and, hence, AND circuit 28–68 also produces "0" signals at its output. The inputs to NOR circuit 28–84 both being "0's" causes a "1" signal to appear at its output. It may be recalled that this was the condition asumed when the "not carry" input to AND circuit 22–68 was discussed.

Summarizing then, the not carry-carry signal pattern appearing at the output of NOR circuits 84 when reading from right to left is 0001. This pattern is applied to the NOT circuits 22–90, 24–90, 26–90 and 28–90 so that the carry-not carry pattern appearing at the output of these NOT circuits is 1110, again reading from right to left.

In forming the true sum of the input signals it is necessary to combine the carry-not carry pattern with the logical sum pattern. This function is performed by the AND circuits 58 and 64 and the NOR circuit 80 of each stage. In AND circuit 22–64 the "0" carry signal from NOT circuit 28–90 is combined with the logical sum signal appearing at the output of NOT circuit 22–54. As a result, this last mentioned AND circuit outputs a "0" to NOR circuit 22–80. AND circuit 22–58 receives the "not carry" signal, which is a "1," from NOR circuit 24–84 by way of conductors 70 and 74. It also receives a "0" signal from the output of NOR circuit 22–50 by way of conductor 56. It can be seen that NOR circuit 22–80 therefore has both of its inputs at the "0" level, causing a logical "1" to appear at its output. Moving on to stage $n$, AND circuit 24–64 has both of its inputs at the logical "1" level and, hence, causes the NOR circuit 24–80 to output a logical "0" signal. By following the same type of analysis it can be seen that the output signal from NOR circuits 26–80 and 28–80 will both be logical "1" signals. The signal groups formed at the outputs of the NOR circuit 80 reading from left to right is 1101. This is the binary representation of the decimal number 13, which is the true sum of the assumed input numbers, decimal numbers 10 and 3.

Thus it is apparent that this invention provides means whereby the various objects and advantages may successfully be achieved.

While I have shown and described the preferred embodiment of my invention, it will be understood that the latter may be embodied otherwise than as herein specifically illustrated or described, and that in the illustrated embodiment certain changes in the details and construction and in the arrangement of components may be made without departing from the underlying scope of the invention. For example, it is possible to rearrange the connections to the AND circuits 38 and 40 of each stage so that the direct inputs $X_n$ and $Y_n$ are applied to the AND circuits 38 while the complement inputs $\overline{X}_n$ and $\overline{Y}_n$ are applied to the AND circuits 40. This has the effect of causing the logical sum signal S' to appear at the output of NOR circuit 50 rather than the complement of the logical sum signal. The output of NOR circuits 50 could therefore be applied to the AND circuits 68 as the carry enable signal. By properly combining the outputs from NOR circuits 50 and NOT circuits 54 with the carry and not carry signals developed by the carry generating network in the AND circuits 58 and 64, it is possible to get the true sum at the outputs of the NOR circuits 80.

What is claimed as new and for which it is desired to secure by Letters Patent is set forth in the appended claims.

What is claimed is:

1. Apparatus for forming the sum of two multi-digit binary numbers X and Y comprising: a plurality of logic circuit stages adapted to receive the input signals indicative of two multidigit binary numbers designated X and Y, each of said stages including input logic circuit means adapted to receive the input signals $X_n$, $Y_n$, $\overline{X}_n$, and $\overline{Y}_n$, where $n$ is an integer indicating the digit position in said multidigit binary numbers, said input signals $X_n$, $Y_n$, $\overline{X}_n$, and $\overline{Y}_n$, representing pairs of digits of equal significance and the complements of these digits for forming a signal $S'_n$ representing the logical sum of said input signals, and a signal $\overline{S'_n}$ representing the complement of said logical sum; carry signal generating means for generating a signal $C_n$ and a signal $\overline{C_n}$ for propagation to stage $n+1$ including a pair of AND logic circuits each having a pair of inputs and an output, said inputs on a first and said pair of AND circuits being adapted to receive the signals $X_n$ and $Y_n$ in the even ordered stages and the complement signals $\overline{X_n}$ and$\overline{Y_n}$ in the odd ordered stages, and said inputs on the second of said pair of AND circuits being connected to receive said logical sum signal $S'_n$ and a signal $\overline{C_{n-1}}$ in the even ordered stages and a signal $C_{n-1}$ in the odd ordered stages, a NOR logic circuit having a pair of inputs and an output, means connecting the outputs of said AND logic circuits to said NOR circuit inputs, such that the signal $C_n$ is formed at the output of said NOR circuit in even stages and the signal $\overline{C_n}$ is formed at the output of said NOR circuit in odd stages; inverter means connected to the output of said NOR circuit; and further logic circuit means responsive to said signals $C_{n-1}$ and $\overline{C_{n-1}}$ and said signals $S'_n$ and $\overline{S'_n}$ for forming a signal group representing the sum of said two binary number groups.

2. Apparatus for forming the sum of two binary numbers X and Y, comprising: a plurality of logic circuit stages adapted to receive the input signals indicative of two multidigit binary numbers X and Y, each of said stages including input logic circuit means adapted to receive the input signals $X_n$, $Y_n$, $\overline{X_n}$, and $\overline{Y_n}$, where $n$ is an integer indicating the digit position in said multidigit binary numbers, said signals $X_n$, $Y_n$, $\overline{X_n}$, and $\overline{Y_n}$ representing pairs of digits of equal significance and the complement of these digits for forming a signal $S'_n$ representing the logical sum of said input signals, and a signal $\overline{S'_n}$ representing the complement of said logical sum; carry signal generating means for generating a signal $C_n$ and a signal $\overline{C_n}$ for propagation to stage $n+1$ including a pair of AND logic circuits each having a pair of inputs and an output, said inputs on a first of said pair of AND circuits being adapted to receive the signals $X_n$, and $Y_n$ in the odd ordered stages and the complement signals $\overline{X_n}$ and $\overline{Y_n}$ in the even ordered stages and said inputs on the second of said pair of AND circuits being connected to receive said logical sum signals $S_n$ and a signal $\overline{C_{n-1}}$ in the odd ordered stages and a signal $C_{n-1}$ in the even ordered stages, a NOR logic circuit having a pair of inputs and an output, means connecting the outputs of said AND logic circuits to said NOR circuit inputs, such that the signal $C_n$ is formed at the output of said NOR circuit in odd stages and the signal $\overline{C_n}$ is formed at the output of said NOR circuit in even stages; inverter means connected to the output of said NOR circuit; and further logic circuit means responsive to said signals $C_{n-1}$ and $\overline{C_{n-1}}$ and said signals $S'_n$ and $\overline{S'_n}$ for forming a signal group representing the true sum of said two binary number groups.

3. Apparatus for forming the sum of two binary numbers X and Y, comprising: a plurality of EXLUSIVE OR logic circuit stages adapted to receive the input signals indicative of two multidigit binary numbers designated X and Y, each of said EXCLUSIVE OR logic circuit stages having means adapted to receive the input signals $X_n$, $Y_n$, $\overline{X_n}$, and $\overline{Y_n}$, where $n$ is an integer indicating the digit position in said multidigit binary numbers, said input signals $X_n$, $Y_n$, $\overline{X_n}$, and $\overline{Y_n}$ representing pairs of digits of equal significance and the complement of these digits for forming a signal $S'_n$ representing the logical sum of said input signals, and a signal $\overline{S'_n}$ representing the complement of said logical sum; carry signal generating means for generating a signal $C_n$ and a signal $\overline{C_n}$ for propagation to stage $n+1$ including a pair of AND logic circuits each having a pair of inputs and an output, said inputs on a first of said pair of AND circuits being adapted to receive the signals $X_n$ and $Y_n$ in the even ordered stages and the signals $\overline{X_n}$ and $\overline{Y_n}$ in odd ordered stages, and said inputs on the second of said pair of AND circuits being connected to receive said partial sum signal $S_n$ and a signal $\overline{C_{n-1}}$ in even ordered stages and a signal $C_{n-1}$ in odd ordered stages, a NOR logic circuit having a pair of inputs and an output, means connecting the outputs of said AND logic circuits to said NOR circuit inputs, such that the signal $C_n$ is formed at the output of said NOR circuit in even stages and the signal $\overline{C_n}$ is formed at the output of said NOR circuit in odd stages; inverter means connected to the output of said NOR circuit; and further EXCLUSIVE OR logic circuit means responsive to said signals $C_{n-1}$ and $\overline{C_{n-1}}$ and said signals $S'_n$ and $\overline{S'_n}$ for forming a signal group representing the sum of said two binary number groups.

4. Apparatus as in claim 1 wherein at least some of each of said input logic circuit means comprises: a further pair of AND logic circuits each having at least two input terminals and an output terminal, said input terminals on a first of said further pair of AND logic circuits being adapted to receive said input signals $\overline{X_n}$ and $Y_n$ and said input terminals on the second of said further pair of AND logic circuits being adapted to receive said input signals $X_n$ and $\overline{Y_n}$; a second NOR logic circuit; means connecting said output terminals of said further AND logic circuits to the input terminals of said second NOR logic circuit, thereby forming the signal $\overline{S'_n}$ at the output of said second NOR logic circuit, and inverter means connected to said second NOR circuit for forming the logical sum signal $S'_n$.

5. Apparatus as in claim 1 wherein at least some of said input logic circuit means comprises a further pair of AND logic circuits being adapted to receive said input terminals and an output terminal, said input terminals on a first of said further pair of AND logic circuits being adapted to receive said input signals $X_n$ and $Y_n$ and said input terminals on the second of said further pair of AND logic circuits being dapted to receive said input signals $\overline{X_n}$ and $\overline{Y_n}$; a second NOR logic circuit, means connecting said output terminals of said further AND logic circuits to the input terminals of said second NOR logic circuit, thereby forming the logical sum signal $S'_n$ at the output of said second NOR logic circuit, and inverter means connected to said second NOR circuit for forming the complement signal $\overline{S'_n}$ of said logical sum signal $S'_n$.

6. Apparatus as in claim 1 wherein said further logic circuit means comprises: a further pair of AND logic circuits each having a pair of input terminals and an output terminal, the input terminals on a first of said further pair of AND logic circuits connected to receive the signals $\overline{S'_n}$ and $\overline{C_{n-1}}$ and the input terminals on the second of said further pair of AND logic circuits connected to receive the signals $S'_n$ and $C_{n-1}$; second NOR logic circuit means having a pair of inputs and an output; and means connecting said output terminals of said further pair of AND logic circuits to said second NOR logic circuit inputs, such that a signal $S_n$ representing the true sum digit appears at said second NOR logic circuit output.

7. Apparatus as in claim 2 wherein said further logic circuit means comprises: a further pair of AND logic circuits each having a pair of input terminals and an output terminal, the input terminals of a first of said further pair of AND logic circuits connected to receive the signals $\overline{S'_n}$ and $C_{n-1}$ and the input terminals on the second of said further pair of AND logic circuits connected to receive the signals $S'_n$ and $\overline{C_{n-1}}$; second NOR logic circuit means having a pair of inputs and an output; and means connecting said output terminals of said further pair of AND logic circuits to said second NOR logic circuit inputs, such that a signal $S_n$ representing the true sum digit appears at said second NOR logic circuit output.

8. Apparatus as in claim 2 wherein at least some of each of said logic circuit means comprises: a further pair of AND logic circuits each having at least two input terminals and an output terminal, said input terminals on a first of said further pair of AND logic circuits being adapted to receive said input signals $\overline{X}_n$ and $Y_n$ and said input terminals on the second of said further pair of AND logic circuits being adapted to receive said input signals $X_n$ and $\overline{Y}_n$; a second NOR logic circuit; means connecting said output terminals of said further AND logic circuits to the input terminals of said second NOR logic circuit, thereby forming the signal $\overline{S'}_n$ at the output of said second NOR logic circuit, and inverter means connected to said second NOR circuit for forming the logical sum signal $S'_n$.

9. Apparatus as in claim 2 wherein at least some of each of said logic circuit means comprises: a further pair of AND logic circuits each having at least two input terminals and an output terminal, said input terminals on a first of said further pair of AND logic circuits being adapted to receive said input signals $X_n$ and $Y_n$ and said input terminals on the second of said further pair of AND logic circuits being adapted to receive said input signals $\overline{X}_n$ and $\overline{Y}_n$; a second NOR logic circuit; means connecting said output terminals of said further AND logic circuits to the input terminals of said second NOR logic circuit, thereby forming the signal $S'_n$ at the output of said second NOR logic circuit, and inverter means connected to said second NOR circuit for forming the complement logical sum signal $\overline{S'}_n$.

10. Apparatus as in claim 2 wherein said further logic circuit means comprises: a further pair of AND logic circuits each having a pair of input terminals and an output terminal, the input terminals on a first of said further pair of AND logic circuits connected to receive the signals $\overline{S'}_n$ and $C_{n-1}$ and the input terminals on the second of said further pair of AND logic circuits connected to receive the signals $S'_n$ and $\overline{C}_{n-1}$; a second NOR logic circuit means having a pair of input and an output; and means connecting the output terminals of said further pair of AND logic circuits to said second NOR logic circuit inputs, such that a signal $S_n$ representing the true sum digit appears at said second NOR logic circut output.

11. Apparatus as in claim 2 wherein said further logic circuit means comprises: a further pair of AND logic circuits each having a pair of input terminals and an output terminal, the input terminals on a first of said further pair of AND logic circuits connected to receive the signals $\overline{S'}_n$ and $\overline{C}_{n-1}$ and the input terminals on the second of said further pair of AND logic circuits connected to receive the signals $S'_n$ and $C_{n-1}$; a second NOR logic circuit means having a pair of inputs and an output; and means connecting said output terminals of said further pair of AND logic circuits to said second NOR logic circuit inputs, such that a signal $S_n$ representing the true sum digit appears at said second NOR logic circuit output.

12. An arithmetic system for use in a digital computer of the type wherein operands are represented by a plurality of bivalued signals, comprising: a first plurality of logic circuit stages, each adapted to receive two sets of digital signals for producing the true and complement of logical sum representing signals; a second plurality of logic circuits adapted to receive on alternate stages, the true and compelment of said two sets of digital signals respectively, for generating carry representing signals when said sets of digital signals are of a predetermined value; carry propagating means adapted to receive the true representation of said logical sum signals and respectively, the carry representing signals and the complement of the carry representing signals on alternate ones of said stages for providing respectively, the complement and the true representation of the carry signals for alternate next higher-order stages; and a further set of logic circuits adapted to receive the true and complement values of said logical sum and carry signals for performing a completed set of sum signals representing true binary values.

13. Apparatus as in claim 12 wherein said first plurality of logic circuit stages each includes an EXCLUSIVE OR circuit adapted to receive on separate inputs thereto, the true and complement representations of said two sets of digital signals and inverter means connected to the output of said EXCLUSIVE OR circuit.

14. Apparatus as in claim 12 wherein said second plurality of logic circuits each comprises a logical AND circuit.

15. Apparatus in claim 12 wherein said carry propagating means includes a first AND circuit having a pair of input terminals and an output terminal, said input terminals adapted to receive said logical sum signals and said carry representing signals or the complement of the carry representing signal; and a logical NOR circuit having at least one input terminal thereof adapted to receive signals from the output terminal of said AND circuit.

16. Apparatus as in claim 12 wherein said further set of logic circuits each comprises an EXCLUSIVE OR circuit having a plurality of input terminals and an output terminal, and means connecting said input terminals to receive said true and complement values of said logical sum signals along with the true and complement values of said carry representing signals from the adacent lower-order stage.

References Cited by the Examiner

UNITED STATES PATENTS

| | | | |
|---|---|---|---|
| 2,803,401 | 8/1957 | Nelson | 235—176 |
| 2,952,407 | 9/1960 | Weiss | 235—175 |

ROBERT C. BAILEY, *Primary Examiner.*

MALCOLM A. MORRISON, *Examiner.*

J. S. IANDIORIO, N. J. SPIVAK, *Assistant Examiners.*